United States Patent [19]
Shimonou

[11] Patent Number: 5,253,238
[45] Date of Patent: Oct. 12, 1993

[54] ARRANGEMENT FOR PRODUCING PRECISE TRACKING ERROR SIGNAL FOR OPTICAL DISK DEVICE

[75] Inventor: Shigeru Shimonou, Tokyo, Japan

[73] Assignee: NEC Corporation, Tokyo, Japan

[21] Appl. No.: 914,455

[22] Filed: Jul. 17, 1992

[30] Foreign Application Priority Data

Jul. 17, 1991 [JP] Japan .................................. 3-175645
Aug. 30, 1991 [JP] Japan .................................. 3-220549

[51] Int. Cl.$^5$ ............................................ G11B 7/13
[52] U.S. Cl. ............................... 369/44.25; 369/44.41; 369/44.34; 369/44.28
[58] Field of Search ................ 369/44.41, 44.42, 44.34, 369/44.28, 44.11, 44.25, 44.32, 50, 124; 360/77.01, 77.02, 78.06, 78.07

[56] References Cited

U.S. PATENT DOCUMENTS

| | | | |
|---|---|---|---|
| 4,879,707 | 11/1989 | Getreuer et al. .................. | 369/44.28 |
| 4,914,725 | 4/1990 | Belser et al. ..................... | 318/560 |
| 5,079,756 | 1/1992 | Kuwabara ........................ | 369/44.28 |
| 5,136,567 | 8/1992 | Nagahara et al. ................ | 369/44.41 |
| 5,144,609 | 9/1992 | Takeda et al. ................... | 369/44.25 |
| 5,159,589 | 10/1992 | Ohsato ............................ | 369/44.41 |

*Primary Examiner*—Aristotelis Psitos
*Assistant Examiner*—Muhammad N. Edun
*Attorney, Agent, or Firm*—Sughrue, Mion, Zinn, Macpeak & Seas

[57] ABSTRACT

To produce a tracking error signal (28) precisely indicating a positioning error of an optical beam with respect to one of recording tracks in a radial direction of an optical disk (12), a compensation section (31-36) compensates for a subtracted signal produced by subtraction between first and second electric output signals of first and second sensors (23 and 24) which receive first and second partial beams reflected from the optical disk by irradiating the optical disk by the optical beam. In the compensation section, an added signal is produced between the first and the second electric output signals. When the added signal is greater than a predetermined reference level, a comparator produces a compared result signal of a high level. Otherwise, the comparator produces the compared result signal of a low level. A sample-and-hold circuit passes the subtracted signal therethrough while the compared result signal has the high level. When the compared result signal turns from the high level to the low level, the circuit samples the subtracted signal into a sampled signal and holds the sampled signal while the compared result signal has the low level. The tracking error signal is produced by adding an inverted signal of the subtracted signal to a multiplied signal produced by multiplying output of the circuit by two.

5 Claims, 5 Drawing Sheets

5,253,238

ARRANGEMENT FOR PRODUCING PRECISE TRACKING ERROR SIGNAL FOR OPTICAL DISK DEVICE

BACKGROUND OF THE INVENTION

This invention relates to a tracking error signal producing arrangement for use in a tracking control device for controlling an optical disk device. This invention relates also to the tracking control device.

The optical disk device comprises an optical information recording disk having a principal surface and grooves formed on the principal surface for defining information recording tracks extended across a radius of the optical information recording disk. The information recording tracks are arranged on the principal surface with a predetermined track pitch. An irradiating unit irradiates a part of the principal surface by an optical beam to make the part reflect the optical beam as a reflected light beam having first and second partial light beams. The first and the second partial light beams result from first and second fractions of the part. The first and the second fractions appear by dividing the part radially of the optical information recording disk. First and second photoelectric sensors receive the first and the second partial light beams to produce first and second electric output signals, respectively. An actuating arrangement actuates the irradiating unit in compliance with a control signal to move the irradiating unit radially of the optical information recording disk.

The tracking error signal producing arrangement is connected to the first and the second photoelectric sensors. The tracking error signal producing arrangement is for producing a tracking error signal in response to the first and the second electric output signals. The tracking error signal indicates a positioning error of the optical beam with respect to a particular one of the information recording tracks in a radial direction of the optical information recording disk.

The tracking control device comprises a control signal producing arrangement connected to the tracking error signal producing arrangement. The control signal producing arrangement produces the control signal in compliance with the tracking error signal to make the actuating arrangement actuate the irradiating unit so that the tracking error signal becomes to indicate the positioning error equal to zero. As a result, the irradiating unit irradiates the particular one of the information recording tracks by the optical beam.

The tracking error signal producing arrangement is disclosed in U.S. Pat. No. 4,914,725 issued to Karl A. Belser et al. The Belser et al tracking error signal producing arrangement comprises a subtracter connected to the first and the second photoelectric sensors for subtracting the second electric output signal from the first electric output signal to produce a subtracted signal which is for use as the tracking error signal.

As will later be described, the subtracted signal has an amplitude which varies in compliance with a sinusoidal curve to indicate the positioning error while the irradiating unit is moved radially of the optical information recording disk from a periphery of the optical information recording disk towards a center axis of the optical information recording disk. More specifically, the subtracted signal has an amplitude equal to zero to indicate the positioning error when the irradiating unit irradiates a center line of the particular one of the information recording tracks. When the irradiating unit irradiates an inside one-quarter track position which is apart from the center line of the particular one of the information recording tracks towards the center axis of the optical information recording disk by a quarter of the predetermined track pitch, the subtracted signal has a maximum amplitude greater than zero to indicate the positioning error. When the irradiating unit irradiates an outside one-quarter track position which is apart from the center line of the particular one of the information recording tracks towards the periphery of the optical information recording disk by a quarter of the predetermined track pitch, the subtracted signal has a minimum amplitude less than zero to indicate the positioning error.

Thus, the subtracted signal used as the tracking error signal approximately and linearly increases to precisely indicate the positioning error of the optical beam with respect to the particular one of the information recording tracks while the irradiating unit is moved radially of the optical information recording disk from the outside one-quarter track position to the inside one-quarter track position. However, in a case where the irradiating unit irradiates a part of the principal surface except an extent between the outside and the inside one-quarter track positions, the subtracted signal does not precisely indicate the positioning error with respect to the particular one of the information recording tracks in the manner which will become clear as the description proceeds. When the subtracted signal is used as the tracking error signal in the above-mentioned case, the tracking control device inevitably makes the actuating arrangement actuate the irradiating unit so that the irradiating unit irradiates by the optical beam a different track adjacent to the particular one of the information recording tracks rather than the particular one of the information recording tracks.

It is required to obtain a precise tracking error signal precisely indicating the positioning error of the optical beam with respect to the particular one of the information recording tracks even when the irradiating unit irradiates a part of the principal surface except the extent between the outside and the inside one-quarter track positions. Although the Belser et al disclose an adder connected to the first and the second photoelectric sensors for adding the second electric output signal to the first electric output signal to produce an added signal, the added signal is not used in compensating for the subtracted signal to obtain the precise tracking error signal.

SUMMARY OF THE INVENTION

It is therefore an object of this invention to provide a tracking error signal producing arrangement which produces a precise tracking error signal precisely indicating a positioning error of an optical beam with respect to a particular one of information recording tracks of the optical information recording disk even when an irradiating unit irradiates a part of the optical information recording disk except an extent between outside and inside one-quarter track positions with respect to the particular one of the information recording tracks.

It is a specific object of this invention to provide a tracking control device comprising a tracking error signal producing arrangement which produces a precise tracking error signal precisely indicating a positioning error of an optical beam with respect to a particular one of information recording tracks of the optical information recording disk even when an irradiating unit irradiates a part of the optical information recording disk except an extent between outside and inside one-quarter track positions with respect to the particular one of the information recording tracks.

Other objects of this invention will become clear as the description proceeds.

On setting forth the gist of an aspect of this invention, it is possible to understand that a tracking error signal producing arrangement is for use in a tracking control device for controlling an optical disk device which comprises: an optical information recording disk having a principal surface and grooves formed on the principal surface for defining information recording tracks extended across a radius of the optical information recording disk; an irradiating unit for irradiating a part of the principal surface by an optical beam to make the part reflect the optical beam as a reflected light beam having first and second partial light beams, the first and the second partial light beams resulting from first and second fractions of the part, the first and the second fractions appearing by dividing the part radially of the optical information recording disk; first and second photoelectric sensors for receiving the first and the second partial light beams to produce first and second electric output signals, respectively; and an actuating arrangement for actuating the irradiating unit in compliance with a control signal to move the irradiating unit radially of the optical information recording disk. The tracking error signal producing arrangement is connected to the first and the second photoelectric sensors for producing, in response to the first and the second electric output signals, a tracking error signal indicating a positioning error of the optical beam with respect to a particular one of the information recording tracks in a radial direction of the optical information recording disk. The tracking control device comprises: a control signal producing arrangement connected to the tracking error signal producing arrangement for producing the control signal in compliance with the tracking error signal to make the actuating arrangement actuate the irradiating unit so that the tracking error signal becomes to indicate the positioning error equal to zero.

According to the aspect of this invention, the above-understood tracking error signal producing arrangement comprises: (1) a subtracter connected to the first and the second photoelectric sensors for subtracting the second electric output signal from the first electric output signal to produce a subtracted signal; (2) a first adder connected to the first and the second photoelectric sensors for adding the second electric output signal to the first electric output signal to produce a first added signal; (3) a comparator connected to the first adder for comparing the first added signal with a predetermined reference level to produce a compared result signal having high and low levels when the first added signal is greater than the predetermined reference level and when the first added signal is not greater than the predetermined reference level, respectively; (4) a sample-and-hold circuit connected to the subtracter and to the comparator for passing the subtracted signal therethrough as a circuit output signal while the compared result signal has the high level, the sample-and-hold circuit being for sampling the subtracted signal into a sampled signal when a level of the compared result signal turns from the high level to the low level and for holding the sampled signal to produce the sampled signal as the circuit output signal while the compared result signal has the low level; (5) a multiplier connected to the sample-and-hold circuit for multiplying the circuit output signal by two to produce a multiplied signal; (6) an inverter connected to the subtracter for inverting the subtracted signal into an inverted signal; and (7) a second adder connected to the multiplier and to the inverter for adding the multiplied signal to the inverted signal to produce a second added signal which is for use as the tracking error signal.

On setting forth the gist of another aspect of this invention, it is possible to understand that a tracking control device for controlling an optical disk device which comprises: an optical information recording disk having a principal surface and grooves formed on the principal surface for defining information recording tracks extended across a radius of the optical information recording disk; an irradiating unit for irradiating a part of the principal surface by an optical beam to make the part reflect the optical beam as a reflected light beam having first and second partial light beams, the first and the second partial light beams resulting from first and second fractions of the part, the first and the second fractions appearing by dividing the part radially of the optical information recording disk; first and second photoelectric sensors for receiving the first and the second partial light beams to produce first and second electric output signals, respectively; and an actuating arrangement for actuating the irradiating unit in compliance with a control signal to move the irradiating unit radially of the optical information recording disk. The tracking control device comprises: a tracking error signal producing arrangement connected to the first and the second photoelectric sensors for producing, in response to the first and the second electric output signals, a tracking error signal indicating a positioning error of the optical beam with respect to a particular one of the information recording tracks in a radial direction of the optical information recording disk; and a control signal producing arrangement connected to the tracking error signal producing arrangement for producing the control signal in compliance with the tracking error signal to make the actuating arrangement actuate the irradiating unit so that the tracking error signal becomes to indicate the positioning error equal to zero.

According to this aspect of this invention, the tracking error signal producing arrangement comprises in the above-understood tracking control device: (1) a subtracter connected to the first and the second photoelectric sensors for subtracting the second electric output signal from the first electric output signal to produce a subtracted signal; (2) a first adder connected to the first and the second photoelectric sensors for adding the second electric output signal to the first electric output signal to produce a first added signal; (3) a comparator connected to the first adder for comparing the first added signal with a predetermined reference level to produce a compared result signal having high and low levels when the first added signal is greater than the predetermined reference level and when the first added signal is not greater than the predetermined reference level, respectively; (4) a sample-and-hold circuit connected to the subtracter and to the comparator for passing the subtracted signal therethrough as a circuit output signal while the compared result signal has the high level, the sample-and-hold circuit being for sampling the subtracted signal into a sampled signal when a level of the compared result signal turns from the high level to the low level and for holding the sampled signal to produce the sampled signal as the circuit output signal while the compared result signal has the low level; (5) a multiplier connected to the sample-and-hold circuit for multiplying the circuit output signal by two to produce a multiplied signal; (6) an inverter connected to the subtracter for inverting the subtracted signal into an inverted signal; and (7) a second adder connected to the multiplier and to the inverter for adding the multiplied signal to the inverted signal to produce a second added signal which is for use as the tracking error signal.

DESCRIPTION OF THE PREFERRED EMBODIMENT

Figure 1:
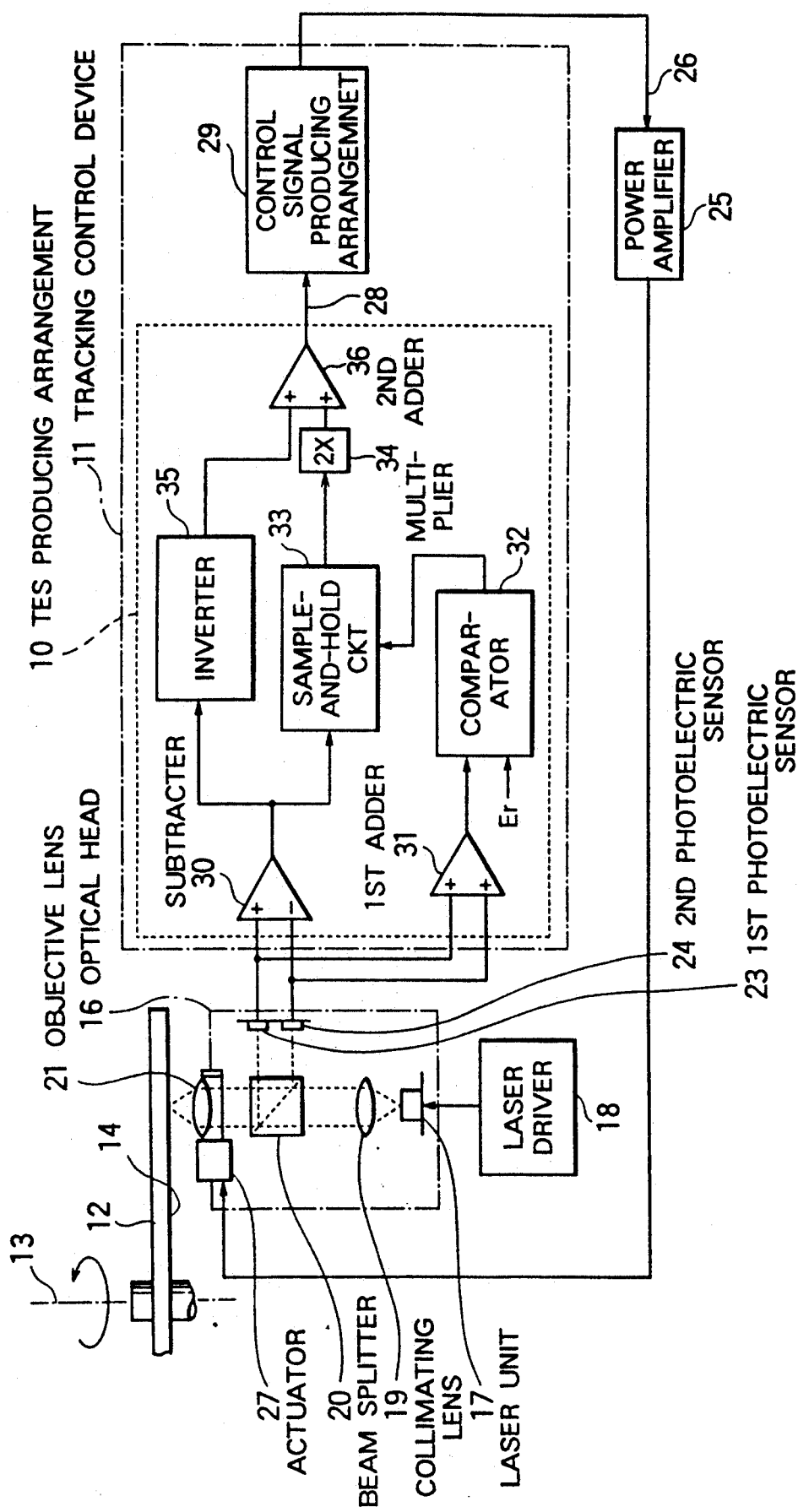
FIG. 1 shows in blocks, together with an optical disk device, a tracking control device comprising a tracking error signal producing arrangement according to an embodiment of this invention.

Referring to FIG. 1, a tracking error signal (TES) producing arrangement 10 according to a preferred embodiment of this invention is for use in a tracking control device 11. The tracking control device 11 is for controlling an optical disk device.

The optical disk device comprises an optical information recording disk 12 rotatable around a center axis 13. The optical information recording disk 12 may be a magneto-optical recording disk and has a principal surface 13 and grooves formed on the principal surface 14.

Figure 2:
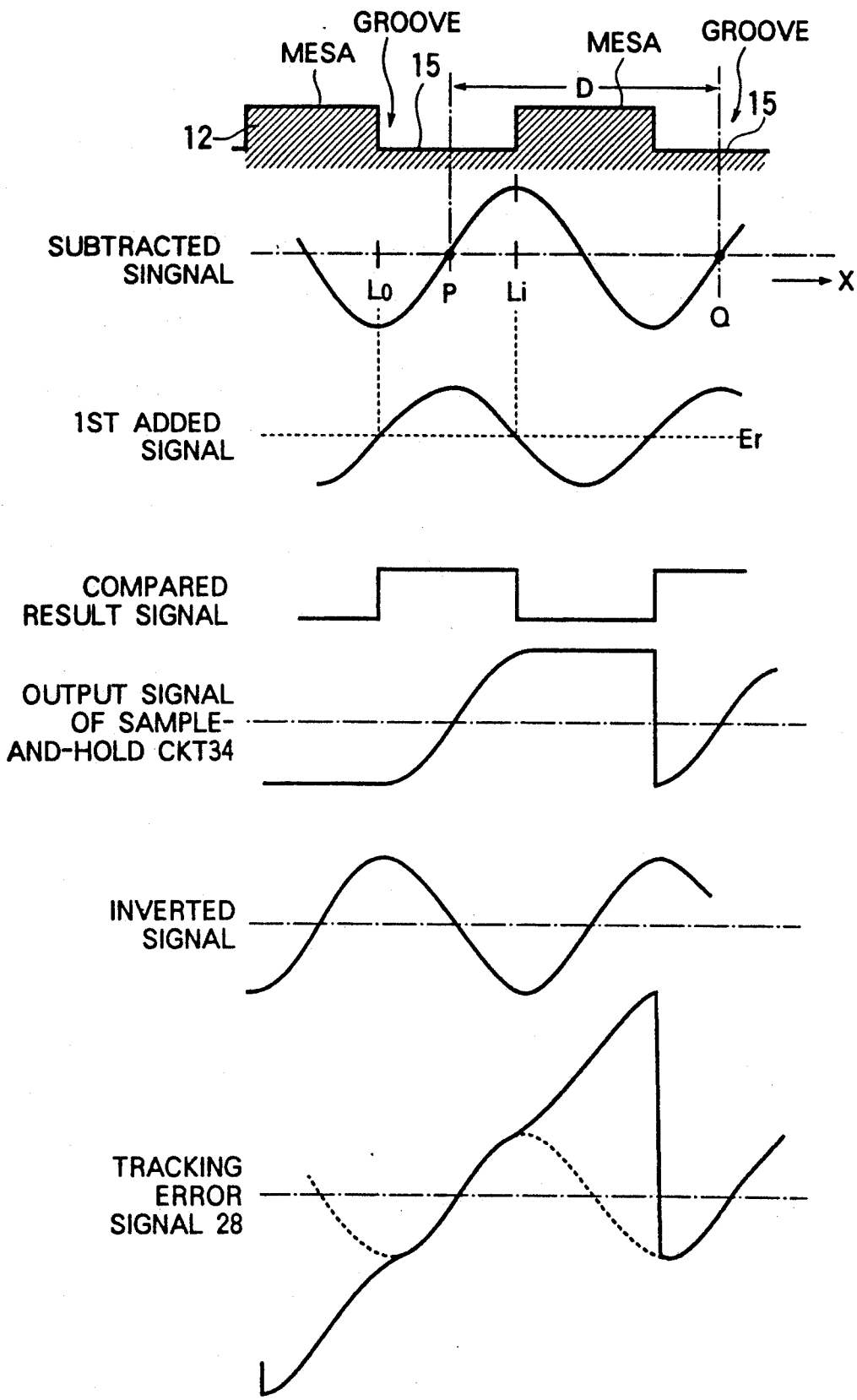
FIG. 2 is a diagram for use in describing operation of the tracking error signal producing arrangement illustrated in FIG. 1.

In the manner illustrated in FIG. 2 along a first or top row, the grooves define information recording tracks 15 between mesas. The information recording tracks 15 are extended across a radius of the optical information recording disk 12. The information recording tracks 15 are arranged on the principal surface 14 (FIG. 1) with a predetermined track pitch D. That is, a distance between center lines of adjacent information recording tracks 15 is equal to the predetermined track pitch D. The information recording tracks 15 may be either a concentric tracks or circumvolutions of a spiral track as known in the art.

In FIG. 1, the optical disk device further comprises an optical head 16. The optical head 16 comprises a semiconductor laser unit 17 which is supplied with a driving current from a laser driver 18 for generating a laser beam. Supplied with the laser beam, a collimating lens 19 produces a parallel laser beam which is supplied through a beam splitter 20 to an objective or focusing leans 21. The objective lens 21 focuses the parallel laser beam on a part of the principal surface 14 of the optical information recording disk 12.

Thus, a combination of the laser unit 17, the laser driver 18, the collimating lens 19, the beam splitter 20, and the objective lens 21 serves as an irradiating unit. The irradiating unit (17, 18, 19, 20, 21) irradiates a part of the principal surface 14 by an optical beam to make the part reflect the optical beam as a reflected light beam having first and second partial light beams. The first and the second partial light beams result from first and second fractions of the part. The first and the second fractions appear by dividing the part radially of the optical information recording disk 12.

The optical head 16 has first and second photoelectric sensors 23 and 24. The first and the second photoelectric sensors 23 and 24 receives the first and the second partial light beams of the reflected light beam through the objective lens 21 and the beam splitter 20 to produce first and second electric output signals, respectively.

Figure 3:
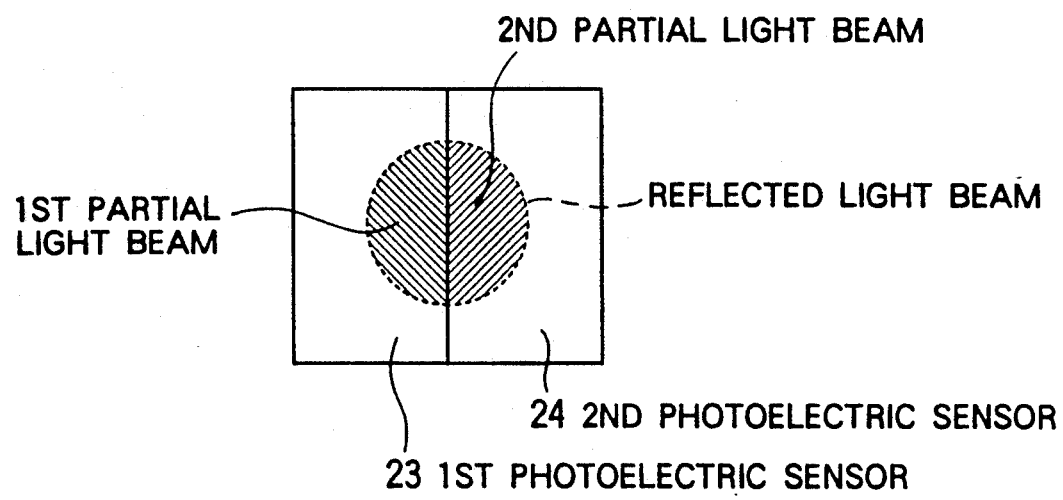
FIG. 3 is a diagram for use in describing operation of photoelectric sensors of the optical device illustrated in FIG. 1.

In the manner illustrated in FIG. 3, the first and the second photoelectric sensors 23 and 24 are practically arranged in the optical head 16 so as to receive first and second halves of the reflected light beam as the first and the second partial light beams when the irradiating unit (17, 18, 19, 20, 21) irradiates the center line of one of the information recording tracks by the optical beam.

In FIG. 1, a power amplifier 25 is supplied with a control signal 26 for amplifying the control signal to produce an amplified control signal as an actuator drive signal. Connected to the power amplifier 25, an actuator 27 actuates the objective lens 21 of the irradiating unit (17, 18, 19, 20, 21) in compliance with the actuator drive signal to move the irradiating unit (17, 18, 19, 20, 21) radially of the optical information recording disk 12.

Thus, the actuator 27 acts in cooperation with the power amplifier 25 as an actuating arrangement. The actuating arrangement (27, 25) actuates the irradiating unit (17, 18, 19, 20, 21) in compliance with the control signal 26 to move the irradiating unit (17, 18, 19, 20, 21) radially of the optical information recording disk 12.

The tracking error signal producing arrangement 10 is connected to the first and the second photoelectric sensors 23 and 24. The tracking error signal producing arrangement 10 is for producing a tracking error signal (TES) 28 in response to the first and the second electric output signals. The tracking error signal 28 indicates a positioning error of the optical beam with respect to a particular one of the information recording tracks 15 (FIG. 2) in a radial direction of the optical information recording disk 12.

The tracking control device 11 comprises a control signal producing arrangement 29 connected to the tracking error signal producing arrangement 10. The control signal producing arrangement 29 produces the control signal 26 in compliance with the tracking error signal 28 to make the actuating arrangement (27, 25) actuate the irradiating unit (17, 18, 19, 20, 21) so that the tracking error signal 28 becomes to indicate the positioning error equal to zero. In other words, the control signal producing arrangement 29 produces the control signal 26 to make the actuating arrangement (27, 25) actuate the irradiating unit (17, 18, 19, 20, 21) so that the irradiating unit (17, 18, 19, 20, 21) irradiates the particular one of the information recording tracks 15 by the optical beam. The control signal producing arrangement 29 may be a servo loop filter which is for controlling a gain thereof and for compensating for a phase of the tracking error signal 28 as is known in the art.

After the actuating arrangement (27, 25) actuates the irradiating unit (17, 18, 19, 20, 21) so that the irradiating unit (17, 18, 19, 20, 21) irradiates the particular one of the information recording tracks 15 by the optical beam, the optical disk device records and reads information in and from the particular one of the information recording tracks 15 by making the irradiating unit (17, 18, 19, 20, 21) irradiate the particular one of the information recording tracks 15 by a strong optical beam.

In FIG. 1, the tracking error signal producing arrangement 10 comprises a subtracter 30 connected to the first and the second photoelectric sensors 23 and 24 for subtracting the second electric output signal from the first electric output signal to produce a subtracted signal. In a practical use, a differential or subtracting amplifier may be used as the subtracter 30. As described in the preamble of the instant specification, the subtracted signal is used as the tracking error signal 28 (FIG. 1) in the Belser et al tracking error signal producing arrangement.

In FIGS. 1 and 2, the subtracted signal will be described. In the manner exemplified in FIG. 2 along a second row, the subtracted signal has an amplitude which varies in compliance with a sinusoidal curve to indicate the positioning error while the irradiating unit (17, 18, 19, 20, 21) is moved in a radial direction X of the optical information recording disk 12 from a periphery of the optical information recording disk 12 towards the center axis 13 of the optical information recording disk 12.

The subtracted signal has an amplitude equal to zero to indicate the positioning error when the irradiating unit (17, 18, 19, 20, 21) irradiates a center line P of a particular one of the information recording tracks 15. When the irradiating unit (17, 18, 19, 20, 21) irradiates an inside one-quarter track position Li which is apart from the center line P of the particular one of the information recording tracks 15 towards the center axis 13 of the optical information recording disk 12 by a quarter of the predetermined track pitch D, the subtracted signal has a maximum amplitude greater than zero to indicate the positioning error. When the irradiating unit (17, 18, 19, 20, 21) irradiates an outside one-quarter track position Lo which is apart from the center line P of the particular one of the information recording tracks 15 towards the periphery of the optical information recording disk 12 by a quarter of the predetermined track pitch D, the subtracted signal has a minimum amplitude less than zero to indicate the positioning error.

Inasmuch as the subtracted signal approximately and linearly increases to precisely indicate the positioning error of the optical beam with respect to the particular one of the information recording tracks 15 while the irradiating unit (17, 18, 19, 20, 21) is moved radially of the optical information recording disk 12 from the outside one-quarter track position Lo to the inside one-quarter track position Li. However, in a specific case where the irradiating unit (17, 18, 19, 20, 21) irradiates a part of the principal surface 14 except an extent between the outside and the inside one-quarter track positions Lo and Li, the subtracted signal does not precisely indicate the positioning error with respect to the particular one of the information recording tracks 15 as mentioned in the preamble of the instant specification. Supposing that the subtracted signal is used as the tracking error signal 28 in the specific case, the control signal producing arrangement 29 of the tracking control device 11 unavoidably makes the actuating arrangement (25, 27) actuate the irradiating unit (17, 18, 19, 20, 21) so that the irradiating unit (17, 18, 19, 20, 21) irradiates by the optical beam an adjacent track adjacent to the particular one of the information recording tracks 15 rather than the particular one of the information recording tracks 15. A center line of the adjacent track is indicated at Q.

The tracking error signal producing arrangement 10 produces a precise tracking error signal 28 precisely indicating a positioning error of the optical beam with respect to the particular one of information recording tracks 15 even when the irradiating unit (17, 18, 19, 20, 21) irradiates a part of the principal surface 14 except an extent between outside and inside one-quarter track positions Lo and Li with respect to the particular one of the information recording tracks 15.

In FIGS. 1 and 2, the tracking error signal producing arrangement 10 will be described in detail. A first adder 31 is connected to the first and the second photoelectric sensors 23 and 24. The first adder 31 adds the second electric output signal to the first electric output signal and produces a first added signal. In a practical use, an adding amplifier may be used as the first adder 31. The first added signal is illustrated in FIG. 2 along a third row. The first added signal has a maximum amplitude when the irradiating unit (17, 18, 19, 20, 21) irradiates each of the center lines P and Q of the information recording tracks 15. When the irradiating unit (17, 18, 19, 20, 21) irradiates each of center lines of the mesas, the first added signal has a minimum amplitude.

A comparator 32 is connected to the first adder 31. The comparator 32 compares an amplitude of the first added signal with a predetermined reference level Er. The predetermined reference level Er is illustrated in FIG. 2 along the third row. The predetermined reference level Er is equal to an amplitude of the first added signal produced when the irradiating unit (17, 18, 19, 20, 21) irradiates a one-quarter track position which is apart from the center line P of the particular one of the information recording tracks by a quarter of the predetermined track pitch D. The one-quarter track position is equivalent to each of the outside and the inside one-quarter track positions Lo and Li.

The comparator 32 produces a compared result signal illustrated in FIG. 2 along a fourth row. The compared result signal has high and low levels when the first added signal is greater than the predetermined reference level Er and when the first added signal is not greater than the predetermined reference level Er, respectively.

A sample-and-hold circuit 33 is connected to the subtracter 30 and to the comparator 32. An output signal of the sample-and-hold circuit 33 is illustrated in FIG. 2 along a fifth row. The sample-and-hold circuit 33 passes the subtracted signal therethrough as the output signal of the sample-and-hold circuit 33 while the compared result signal has the high level. In other words, the sample-and-hold circuit 33 passes the subtracted signal as the output signal as it is. When a level of the compared result signal turns from the high level to the low level, the sample-and-hold circuit 33 samples the subtracted signal into a sampled signal and holds the sampled signal to produce the sampled signal as the output signal of the sample-and-hold circuit 33 while the compared result signal has the low level.

A multiplier 34 is connected to the sample-and-hold circuit 33. The multiplier 34 multiplies the output signal of the sample-and-hold circuit 33 by two and produces a multiplied signal. As the multiplier 34, an amplifier may be used in a practical use.

An inverter 35 is connected to the subtracter 30. The inverter 33 inverts the subtracted signal into an inverted signal. The inverted signal is illustrated in FIG. 2 along a sixth row.

A second adder 36 is typically an adding amplifier and is connected to the multiplier 34 and to the inverter 35. The second adder 36 adds the multiplied signal to the inverted signal and produces a second added signal which is for use as the tracking error signal 28. The tracking error signal 28 is illustrated in FIG. 2 along a seventh or bottom row.

The tracking error signal 28 approximately and linearly increases to precisely indicate the positioning error of the optical beam with respect to the particular one of the information recording tracks 15 while the irradiating unit (17, 18, 19, 20, 21) is moved radially of the optical information recording disk 12 from an outside three-quarter track position to an inside three-quarter track position. The outside three-quarter track position is apart from the center line P of the particular one of the information recording tracks 15 towards the periphery of the optical information recording disk 12 by three quarters of the predetermined track pitch D. The inside three-quarter track position is apart from the center line P of the particular one of the information recording tracks 15 towards the center axis 13 of the optical information recording disk 12 by three quarters of the predetermined track pitch D. In the bottom row of FIG. 2, a broken line indicates the subtracted signal which is used as the tracking error signal in the Belser et al tracking error signal producing arrangement. The tracking error signal 28 produced by the present invention corresponds to the subtracted signal while the irradiating unit (17, 18, 19, 20, 21) is moved radially of the optical information recording disk 12 from the outside one-quarter track position Lo to the inside one-quarter track position Li.

Reviewing FIGS. 1 and 2, a combination of the first adder 31, the comparator 32, the sample-and-hold circuit 33, the multiplier 34, the inverter 35, and the second adder 36 serves as a compensation section in the tracking error signal producing arrangement 10. Connected to the first and the second photoelectric sensors 23 and 24 and to the subtracter 30, the compensation section (31, 32, 33, 34, 35, 36) compensates for the subtracted signal on the basis of the first and the second electric output signals to make the tracking error signal 28 precisely indicate the positioning error of the optical beam of the irradiating unit (17, 18, 19, 20, 21) with respect to the particular one of the information recording tracks in the radial direction of the optical information recording disk 12.

Figure 4:
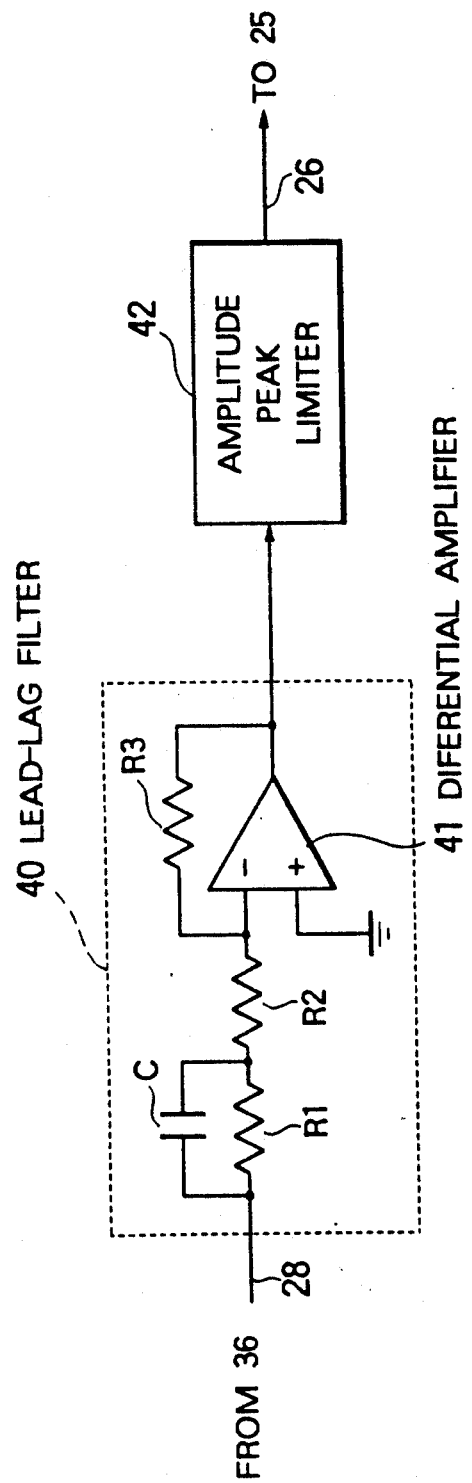
FIG. 4 is a block diagram of a control signal producing arrangement which is used in the tracking control device illustrated in FIG. 1.

Turning to FIG. 4, another control signal producing arrangement 39 may be used as the control signal producing arrangement 29. The control signal producing arrangement 39 comprises a lead-lag filter 40 connected to the second adder 36.

As is known in the art, the lead-lag filter 40 comprises first, second, and third resistors R1, R2, and R3; a capacitor C, and a differential amplifier 41 which has an inverting input terminal, a non-inverting input terminal connected to the ground, and an output terminal. The inverting input terminal of the differential amplifier 41 is connected to the second adder 36 through the first and the second resistors R1 and R2 connected in series with the first resistor R1 connected to the second adder 36 and with the second resistors R2 connected to the inverting input terminal. The capacitor C is connected to the first resistor R1 in parallel. The third resistor R3 is connected between the inverting input terminal and the output terminal of the differential amplifier 41. The lead-lag filter 40 serves as a differentiating circuit which compensates a phase of the tracking error signal 28 to produce a compensated error signal. That is, the lead-lag filter 40 carries out phase-compensation of the tracking error signal 28 and produces the compensated error signal.

An amplitude peak limiter 42 is connected to the lead-lag filter 40 and having positive and negative prescribed values. The amplitude peak limiter 42 limits an amplitude of the compensated error signal to an extent between the positive value and the negative value to produce a limited error signal. In this event, the amplitude peak limiter 42 passes therethrough the compensated error signal as it is. The limited error signal is for use as the control signal 26.

Figure 5:
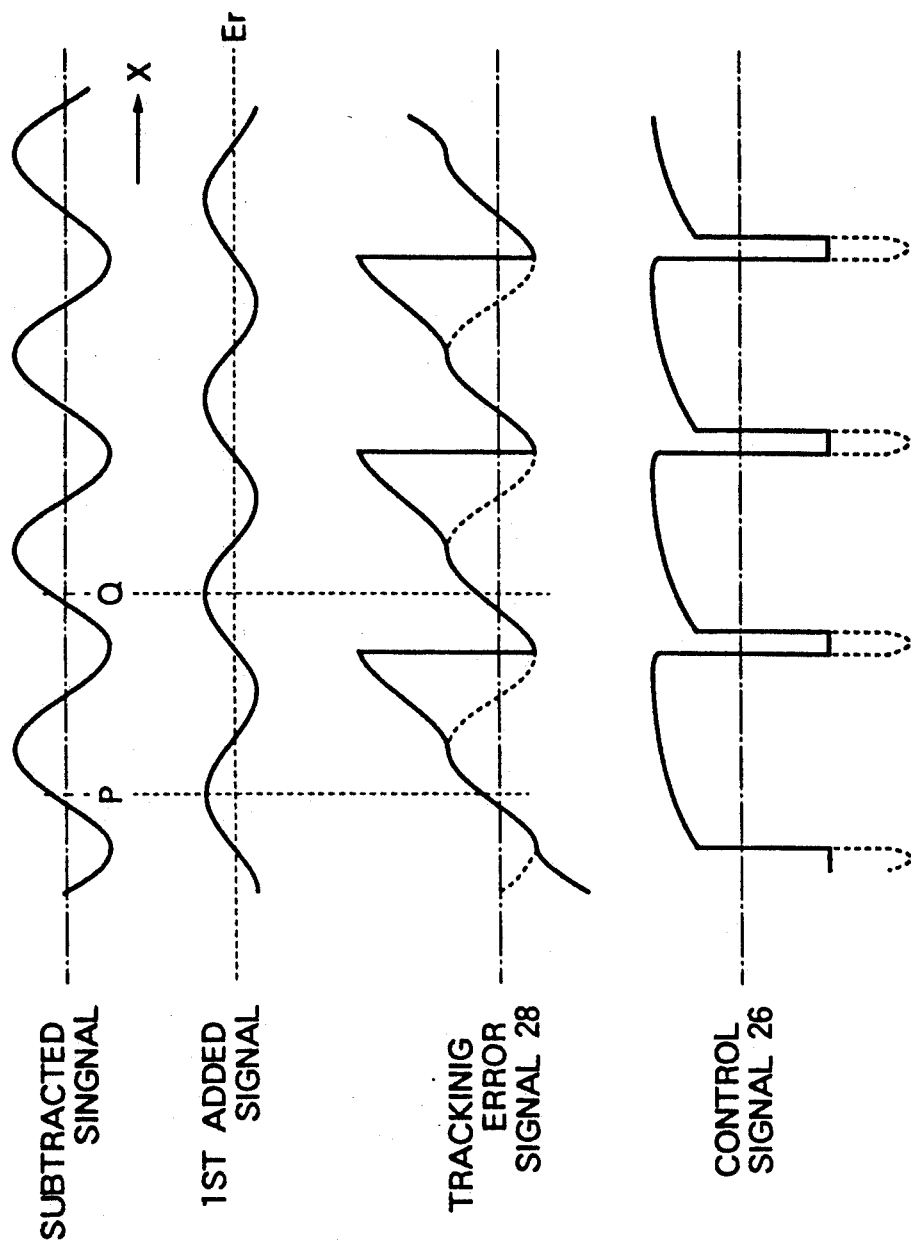
FIG. 5 is a diagram for use in describing operation of the control signal producing arrangement illustrated in FIG. 4.

The control signal 26 produced by the amplitude peak limiter 42 is illustrated in FIG. 5 along a bottom or fourth row. A sliced part of the compensated error signal is indicated at a broken line in the bottom row. By the control signal 26 produced by the amplitude peak limiter 42, it is possible to reliably position the optical beam on the center line P of the particular one of the information recording tracks without occurrence of a positioning failure which might take place due to deviation from the particular one of the information recording tracks.

What is claimed is:

1. A tracking error signal producing arrangement for use in a tracking control device for controlling an optical disk device which comprises: an optical information recording disk having a principal surface and grooves formed on said principal surface for defining information recording tracks extended across a radius of said optical information recording disk; an irradiating unit for irradiating a part of said principal surface by an optical beam to make said part reflect said optical beam as a reflected light beam having first and second partial light beams, said first and said second partial light beams resulting from first and second fractions of said part, said first and said second fractions appearing by dividing said part radially of said optical information recording disk; first and second photoelectric sensors for receiving said first and said second partial light beams to produce first and second electric output signals, respectively; and an actuating arrangement for actuating said irradiating unit in compliance with a control signal to move said irradiating unit radially of said optical information recording disk; said tracking error signal producing arrangement being connected to said first and said second photoelectric sensors for producing, in response to said first and said second electric output signals, a tracking error signal indicating a positioning error of said optical beam with respect to a particular one of said information recording tracks in a radial direction of said optical information recording disk; said tracking control device comprising: a control signal producing arrangement connected to said tracking error signal producing arrangement for producing said control signal in compliance with said tracking error signal to make said actuating arrangement actuate said irradiating unit so that said tracking error signal becomes to indicate the positioning error equal to zero; said tracking error signal producing arrangement comprising:

a subtracter connected to said first and said second photoelectric sensors for subtracting said second electric output signal from said first electric output signal to produce a subtracted signal;

a first adder connected to said first and said second photoelectric sensors for adding said second electric output signal to said first electric output signal to produce a first added signal;

a comparator connected to said first adder for comparing said first added signal with a predetermined reference level to produce a compared result signal having high and low levels when said first added signal is greater than said predetermined reference level and when said first added signal is not greater than said predetermined reference level, respectively;

a sample-and-hold circuit connected to said subtracter and to said comparator for passing said subtracted signal therethrough as a circuit output signal while said compared result signal has said high level, said sample-and-hold circuit being for sampling said subtracted signal into a sampled signal when a level of said compared result signal turns from said high level to said low level and for holding said sampled signal to produce said sampled signal as said circuit output signal while said compared result signal has said low level;

a multiplier connected to said sample-and-hold circuit for multiplying said circuit output signal by two to produce a multiplied signal;

an inverter connected to said subtracter for inverting said subtracted signal into an inverted signal; and a second adder connected to said multiplier and to said inverter for adding said multiplied signal to said inverted signal to produce a second added signal which is for use as said tracking error signal.

2. A tracking error signal producing arrangement as claimed in claim 1, said information recording tracks are arranged on said principal surface with a predetermined track pitch, wherein said predetermined reference level is equal to an amplitude of said first added signal produced when said irradiating unit irradiates a position which is apart from a center line of said particular one of the information recording tracks by a quarter of said predetermined track pitch.

3. A tracking control device for controlling an optical disk device which comprises: an optical information recording disk having a principal surface and grooves formed on said principal surface for defining information recording tracks extended across a radius of said optical information recording disk; an irradiating unit for irradiating a part of said principal surface by an optical beam to make said part reflect said optical beam as a reflected light beam having first and second partial light beams, said first and said second partial light beams resulting from first and second fractions of said part, said first and said second fractions appearing by dividing said part radially of said optical information recording disk; first and second photoelectric sensors for receiving said first and said second partial light beams to produce first and second electric output signals, respectively; and an actuating arrangement for actuating said irradiating unit in compliance with a control signal to move said irradiating unit radially of said optical information recording disk; said tracking control device comprising: a tracking error signal producing arrangement connected to said first and said second photoelectric sensors for producing, in response to said first and said second electric output signals, a tracking error signal indicating a positioning error of said optical beam with respect to a particular one of said information recording tracks in a radial direction of said optical information recording disk; and a control signal producing arrangement connected to said tracking error signal producing arrangement for producing said control signal in compliance with said tracking error signal to make said actuating arrangement actuate said irradiating unit so that said tracking error signal becomes to indicate the positioning error equal to zero; said tracking error signal producing arrangement comprising:

a subtracter connected to said first and said second photoelectric sensors for subtracting said second electric output signal from said first electric output signal to produce a subtracted signal;

a first adder connected to said first and said second photoelectric sensors for adding said second electric output signal to said first electric output signal to produce a first added signal;

a comparator connected to said first adder for comparing said first added signal with a predetermined reference level to produce a compared result signal having high and low levels when said first added signal is greater than said predetermined reference level and when said first added signal is not greater than said predetermined reference level, respectively;

a sample-and-hold circuit connected to said subtracter and to said comparator for passing said subtracted signal therethrough as a circuit output signal while said compared result signal has said high level, said sample-and-hold circuit being for sampling said subtracted signal into a sampled signal when a level of said compared result signal turns from said high level to said low level and for holding said sampled signal to produce said sampled signal as said circuit output signal while said compared result signal has said low level;

a multiplier connected to said sample-and-hold circuit for multiplying said circuit output signal by two to produce a multiplied signal;

an inverter connected to said subtracter for inverting said subtracted signal into an inverted signal; and a second adder connected to said multiplier and to said inverter for adding said multiplied signal to said inverted signal to produce a second added signal which is for use as said tracking error signal.

4. A tracking control device as claimed in claim 3, said information recording tracks are arranged on said principal surface with a predetermined track pitch, wherein said predetermined reference level is equal to an amplitude of said first added signal produced when said irradiating unit irradiates a position which is apart from a center line of said particular one of the information recording tracks by a quarter of said predetermined track pitch.

5. A tracking control device as claimed in claim 4, wherein said control signal producing arrangement comprises:

a lead-lag filter connected to said second adder for carrying out phase-compensation of said tracking error signal to produce a compensated error signal; and an amplitude peak limiter connected to said lead-lag filter and having positive and negative prescribed values for limiting an amplitude of said compensated error signal to an extent between said positive value and said negative value to produce a limited error signal which is for use as said control signal.

* * * * *